INVENTORS
C. VAN DER LELY
BY L. VAN WINGERDEN
Mason, Mason & Albright
Attorneys

July 26, 1966  C. VAN DER LELY ETAL  3,262,254
RECIPROCATING MOWER MOUNTING AND DRIVE MECHANISM
Filed June 25, 1962  7 Sheets-Sheet 3
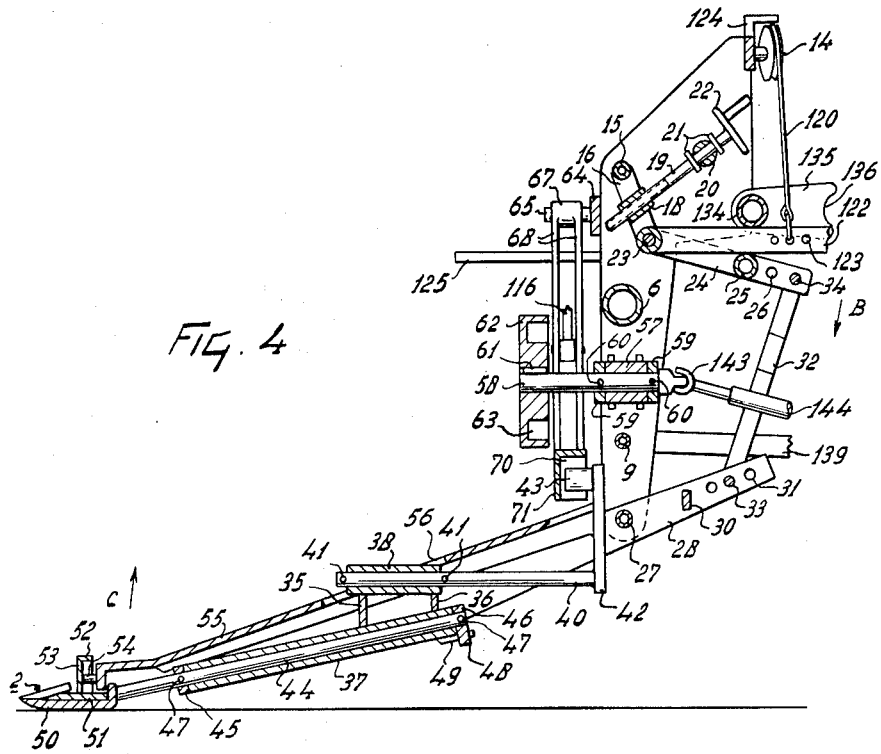
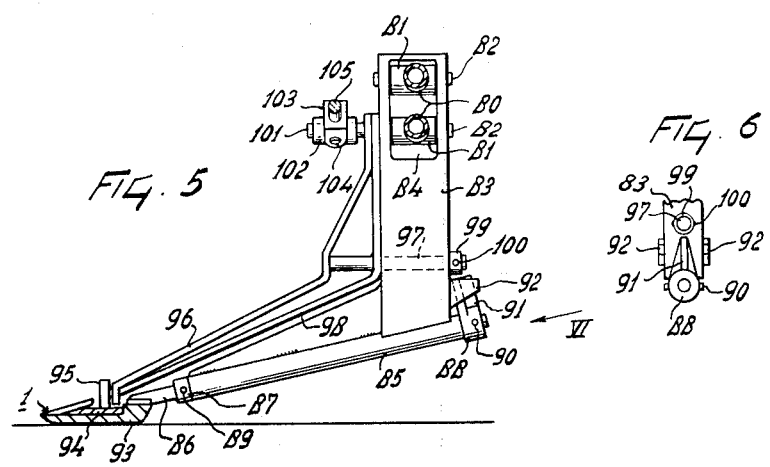
INVENTORS
C. VAN DER LELY
BY L. VAN WINGERDEN
Mason, Mason & Albright
Attorneys

FIG. 7

INVENTORS
C. VAN DER LELY
BY L. VAN WINGERDEN
Mason, Mason & Albright
Attorneys

INVENTORS
C. VAN DER LELY
L. VAN WINGERDEN

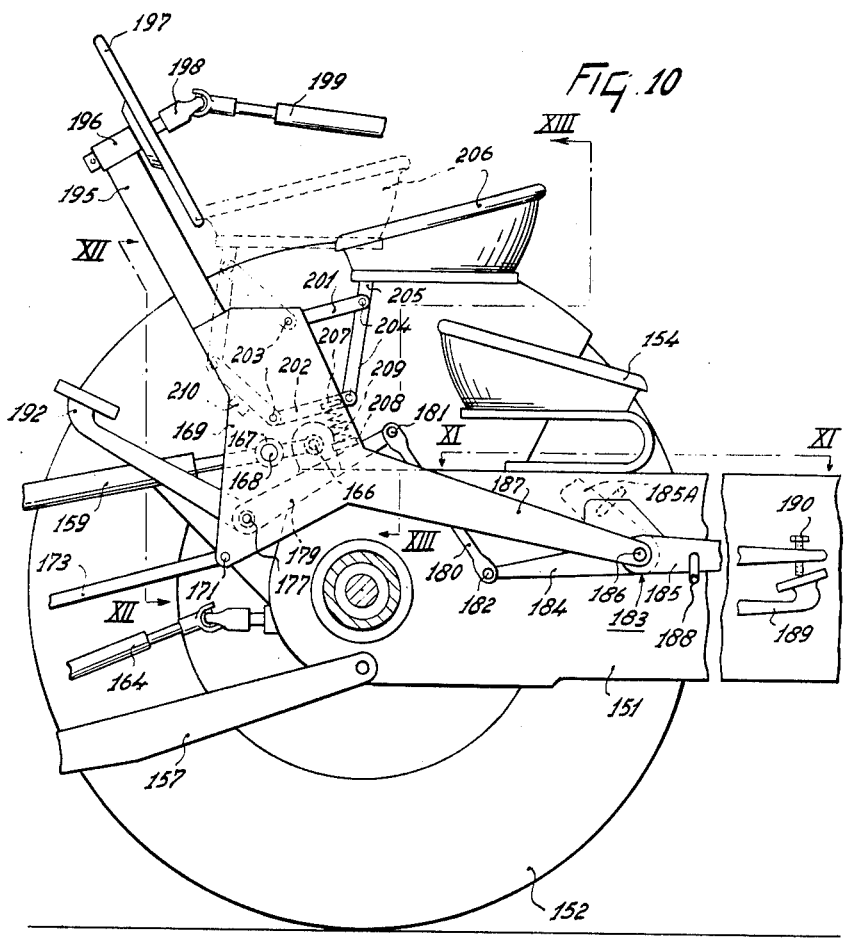

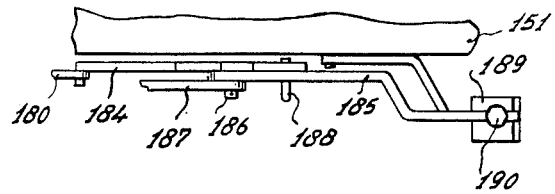
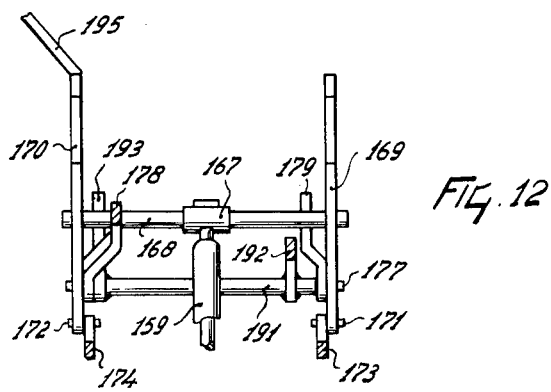
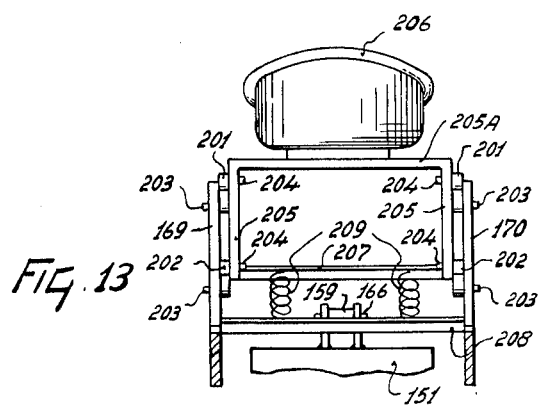

United States Patent Office 3,262,254
Patented July 26, 1966

3,262,254
RECIPROCATING MOWER MOUNTING AND
DRIVE MECHANISM
Cornelis van der Lely, Zug, Switzerland, and Leendert van Wingerden, Dubbeldam, Netherlands, assignors to C. van der Lely N.V., Maasland, Netherlands, a Dutch limited-liability company
Filed June 25, 1962, Ser. No. 205,034
Claims priority, application Netherlands, July 19, 1961, 267,274; Oct. 18, 1961, 270,385
19 Claims. (Cl. 56—6)

This invention relates to mowers and has, as an object, the provision of a mower suitable for agricultural crops which is of a simple, safe and versatile construction such that it can readily be brought from an operative position to a position suitable for transport.

According to the invention, there is provided a mower comprising a frame movable over the ground and a first mowing bar connected to the said frame, wherein a second mowing bar is provided which, in the use of the mower, extends approximately parallel to the first mowing bar, the second mowing bar being turnable relative to the first mowing bar about an axis which is inclined to the horizontal and means being provided to retain it in any one of at least two angular settings about said axis.

Figure 1:
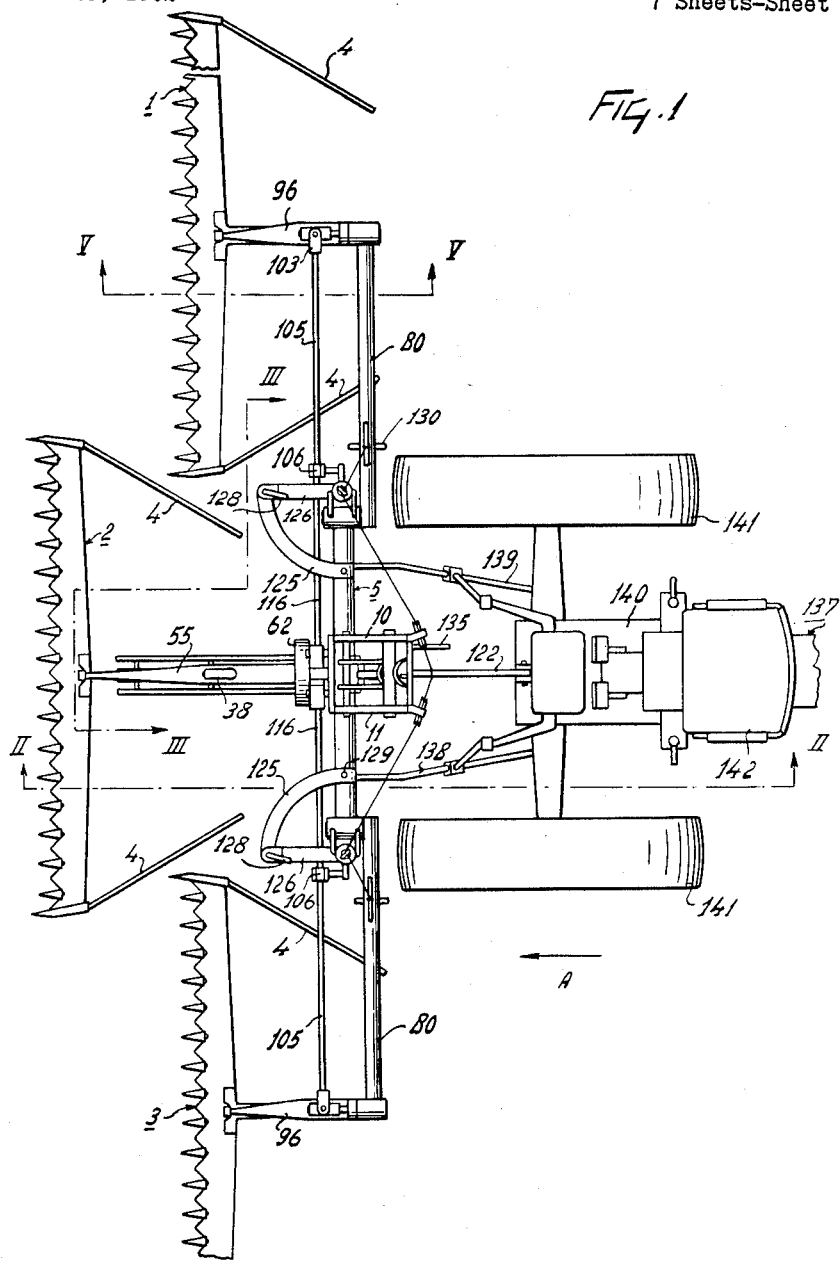
Figure 2:
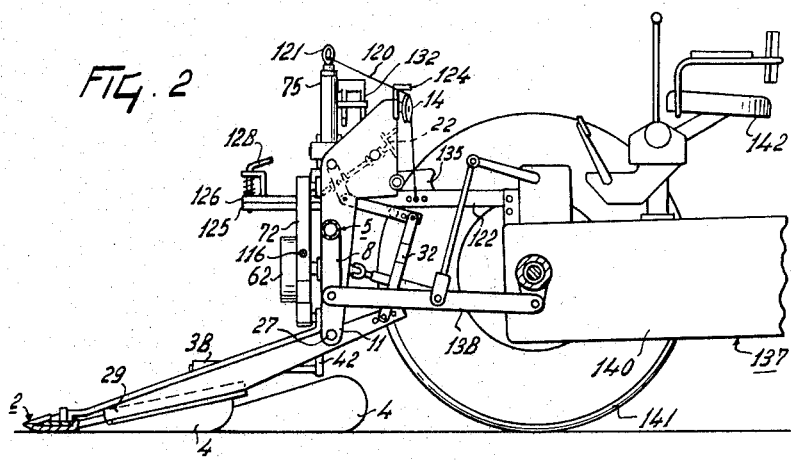
Figure 3:
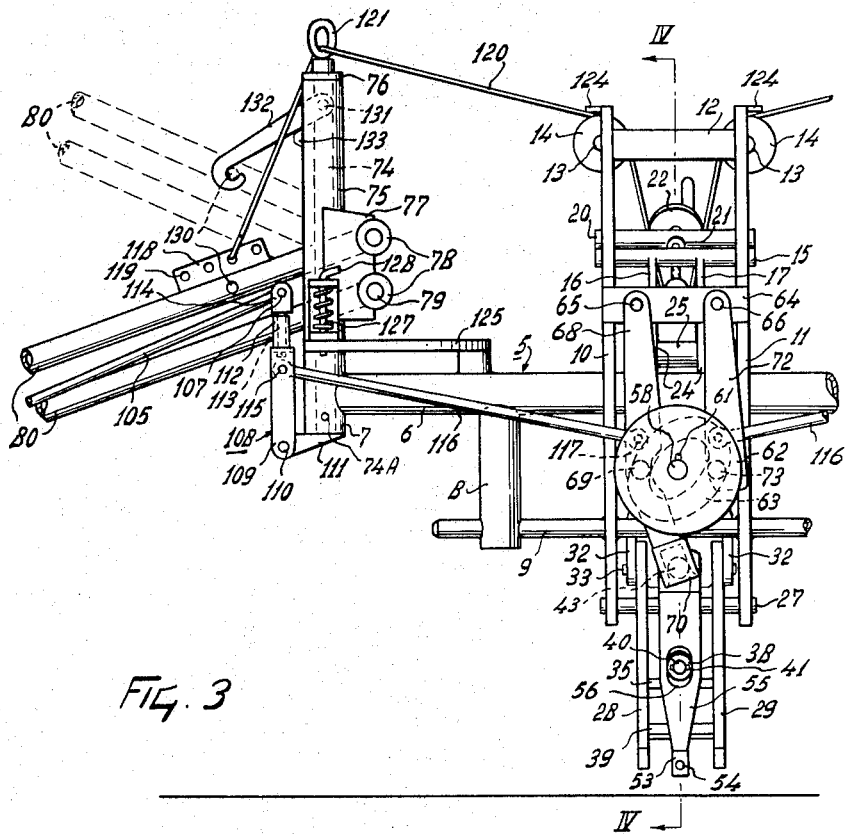
Figure 8:
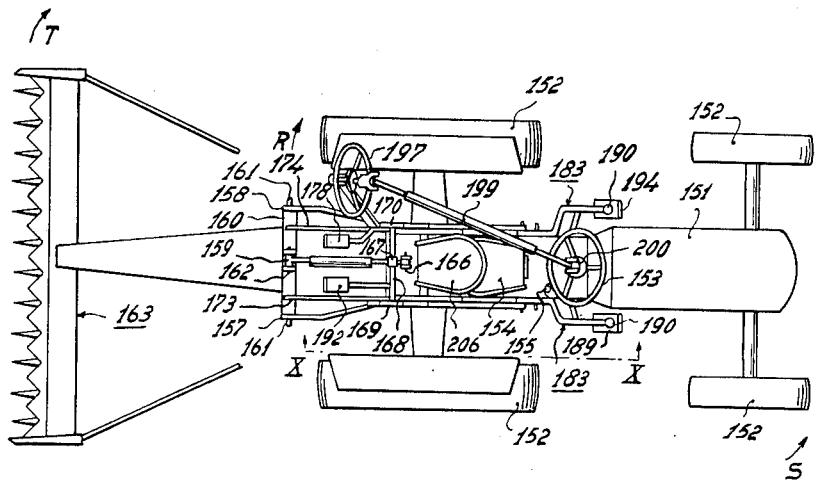
Figure 9:
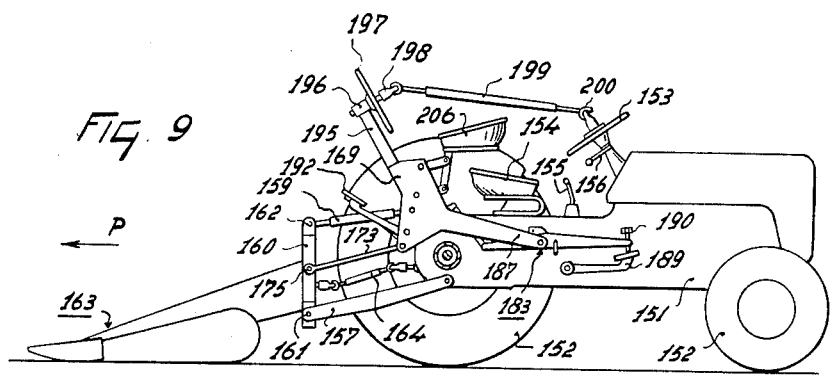

For a better understanding of the invention, and to show how the same may be carried into effect, reference will now be made, by way of example, to the accompanying drawings, in which:

FIGURE 1 is a plan view of a mower in accordance with the invention coupled to a tractor, FIGURE 2 is a section taken on the line II—II of FIGURE 1, FIGURE 3 is a section, to an enlarged scale, taken on line III—III of FIGURE 1, FIGURE 4 is a section taken on the line IV—IV of FIGURE 3, FIGURE 5 is a section, to an enlarged scale, taken on line V—V of FIGURE 1, FIGURE 6 is a fragmentary view of part of the mower as seen in the direction indicated by the arrow VI of FIGURE 5, and FIGURE 7 corresponds to FIGURE 1 but shows certain parts of the mower occupying different relative positions.

Referring to the drawings, the mower has three mowing bars 1, 2 and 3 the opposite ends of which are provided with rearwardly extending swath boards or guides 4 adapted to form crop cut by the mowing bars into swaths having a width which is less than the width of the mowing bars themselves. Each of the mowing bars 1 to 3 is connected to a frame 5 which comprises a horizontal frame beam 6 carrying vertical sleeves 7 (FIGURE 3) at its opposite ends. Two beams 8 which extend vertically downwardly are secured to the beam 6 towards its opposite ends and a horizontal rod or shaft 9 is supported by these beams so as to extend parallel to the beam 6. The opposite ends of the rod or shaft 9 project a short distance beyond the relatively remote sides of the beams 8. Two vertical plates 10 and 11 are secured to central regions of the beam 6 and rod or shaft 9 in such a way that they are spaced a short distance from one another with their planes extending perpendicular to the beam 6 and rod or shaft 9. The upper ends of the two plates 10 and 11 are interconnected by a strengthening strip 12 and two shafts 13 are secured to the opposite ends of the strip 12 adjacent the plates 10 and 11 respectively, these shafts 13 affording axes of rotation for two pulleys 14 which are rotatably journalled upon them.

A horizontal shaft 15 which extends parallel to the beam 6 is journalled in the plates 10 and 11 so as to be rotatable but not axially displaceable and two arms 16 and 17 (FIGURES 3 and 4) project at right-angles from the said shaft 15. A further shaft (which can be seen in broken lines in FIGURE 2) is carried by the arms 16 and 17 so as to extend parallel to the shaft 15, this further shaft having an internally screw-threaded sleeve 18 pivotally mounted on it. The corresponding screw-threaded end of a rod 19 is entered through the sleeve 18, a plain portion of the rod 19 being rotatably but axially immovably lodged in a transverse bore through a shaft 20 which extends parallel to the shaft 15 and which is also journalled in the plates 10 and 11. Axial displacement of the plain portion of the rod 19 relative to the shaft 20 is prevented by collars 21 which are secured to the rod 19 on opposite sides of the shaft 20. The end of the rod 19 remote from the sleeve 18 is provided with a handwheel 22 by which the rod 19 can be manually rotated in either direction.

The ends of the two arms 16 and 17 remote from the shaft 15 accommodate a shaft 23 about which two arms 24 are turnable. The two arms 24 are rigidly interconnected by a tube 25 and are provided with a series of two or more holes 26. The lowermost ends of the plates 10 and 11 located beneath the frame beam 6 are interconnected by a shaft 27 extending parallel to the rod or shaft 9. Two vertical plates 28 and 29 are turnable about the shaft 27 and are rigidly interconnected by a bar 30 (FIGURE 4). The upper ends of the two similar plates 28 and 29 are formed with a series of holes 31 and coupling rods 32 have their lowermost ends pivotally connected to the plates 28 and 29 by means of horizontal pivot pins 33 which are entered through chosen ones of the holes 31. The upper ends of the coupling rods 32 are pivotally connected to the arms 24 by means of horizontal pivot pins 34 entered through chosen ones of the holes 26.

The plates 28 and 29 are also interconnected by supports 35 and 36 to which a bearing 37 is connected and also a second bearing 38. The longitudinal axis of the bearing 37 is inclined downwardly and forwardly relative to the intended direction of travel of the mower so that the end thereof lying closest to the shaft 27 is located at a higher level than the end thereof remote from the shaft 27. The longitudinal axis of the bearing 38 is, on the other hand, disposed substantially horizontally. Reinforcing strips 39 (FIGURE 3) extend between the opposite sides of the bearing 37 and the plates 28 and 29, respectively. The longitudinal axes of the two bearings 37 and 38 are contained in a substantially vertical plane extending perpendicular to the longitudinal axis of the frame beam 6.

A shaft 40 is rotatably journalled in the bearing 38 and is prevented from substantial axial displacements relative thereto by two transverse pins 41 which are entered through it adjacent the opposite ends of the bearing 38. The end of the shaft 40 remote from the bearing 38 carries an arm 42 whose free end, in turn, carries a journal or stub shaft 43. The bearing 37 accommodates a shaft 44 which is prevented from moving axially relative to the bearing by two collars or rings 45 and 46 which are secured to the shaft at opposite ends of the bearing by means of small transverse pins 47. The collar or ring 46 carries an arm 48 which is turnable, together with the shaft 44, between two stops 49 secured to the wall of the bearing 37. The arm 48 and stops 49 thus determine the maximum angle through which the shaft 44 can turn relative to the bearing 37. The leading and lowermost end of the shaft 47 carries a stationary blade 50 of the cutter bar 2, this blade accommodating a relatively movable cutter blade 51. The cutter blade 51 carries a U-shaped bracket 52 whose front side is closed by a plate 53. A journal or stub shaft 54 is disposed between the limbs of the bracket 52 and is carried by the bent-over end of an elongated plate 55 whose opposite end is rigidly secured to the arm 42. The plate 55 is provided with a hole 56 through which the bearing 38 projects.

A horizontal bearing 57 lies between, and is secured to, the plates 10 and 11 and accommodates a horizontal shaft 58 which extends perpendicular to the frame beam 6. The shaft 58 is prevented from moving axially relative to the bearing 57 by two collars or rings 59 which are secured to the shaft 58 on opposite sides of the said bearing by means of small transverse pins 60. A circular disc 62 is secured to the leading end of the shaft 58 by a key or the like 61, the said disc being formed with an elliptically shaped groove or track 63 considered in a direction parallel to the longitudinal axis of the shaft 58 (see FIGURE 3). As can be seen in FIGURE 4, the groove or track 63 is of rectangular cross-section and is formed on that side of the disc 62 which faces the bearing 57.

At a distance above the frame beam 6, the leading edges of the plates 10 and 11, that is to say, the edges facing the disc 62, are interconnected by a vertically disposed strip 64. Two stub shafts or journals 65 and 66 are secured to the strip 64 towards the opposite ends thereof and project forwardly of the mower parallel to the shaft 58. A horizontal bearing 67 is turnable on the stub shaft or journal 65 and carries two relatively spaced parallel plates 68 which, together with the bearing 67, constitute a rockable member which is turnable about the axis afforded by the journal or stub shaft 65.

At the level of the shaft 58 which is substantially below the level of the stub shaft or journal 65, the plates 68 forming part of the said rockable member have a stub shaft or journal 69 secured to them, the stub shaft or journal 69 extending parallel to the stub shaft or journal 65 and projecting forwardly of the foremost plate 68 so as to lie within the noncircular groove or track 63 of the disc 62. The lowermost ends of the two plates 68 projecting below the journal or stub shaft 69 are interconnected by the base of a U-shaped bracket 70 the planes of the limbs of which extend parallel to the longitudinal axes of the stub shaft or journals 65 and 69. The front side of the bracket 70, that is to say, the side remote from the bearing 57, is closed by a vertical plate 71 (FIGURE 4) which extends perpendicular to the limbs of the bracket 70. The journal or stub shaft 43 secured to the upper end of the arm 42 is entered between the limbs of the bracket 70 in the operative position of the mower which is illustrated in the drawings.

A second rockable member is turnable about the stub shaft or journal 66 and is comprised by a pair of plates 72 carrying a stub shaft or journal 73 which is entered in the groove or track 63 in a similar manner to the stub shaft or journal 69. However, the plates 72 do not extend any substantial distance below the journal or stub shaft 73 in contradistinction to the plates 72 and corresponding journal or stub shaft 69.

The construction and arrangement of the mowing bars 1 and 3 is substantially identical and, accordingly, only the construction and arrangement of the mowing bar 1 is described in detail. The same reference numerals are used in the drawings to designate the parts of the mowing bar 3 which correspond symmetrically with parts of the mowing bar 1.

The vertical sleeve 7 which is secured to the end of the frame beam 6 receives a vertical shaft 74 which is secured in position by a small transverse pin 74A. A sleeve 75 is turnable about the upper end of the shaft 74 and is retained against axial displacement relative thereto by the sleeve 7 which is disposed below it and by a ring or collar 76 which is rigidly secured to the shaft 74 above the sleeve 75. The sleeve 75 carries a pair of vertically disposed supporting lugs 77 which, in turn, have two horizontal bearings 78 fastened to them one above the other. The two bearings 78 accommodate two horizontal shafts 79 whose longitudinal axes extend perpendicular to the longitudinal axis of the shaft 74. The ends of two arms 80 are secured to the corresponding ends of the two shafts 79 and the opposite ends of these two arms 80, which are located one above the other, are connected to horizontal bearings 81 (FIGURE 5) which are turnable about two pivot pins 82 mounted in an opening 84 formed in a support 83 for the mowing bar 1. The arrangement is such that the two shafts 79 and the two pivot pins 82 lie at the four corners of a parallelogram linkage having its longer sides afforded by the arms 80.

The lowermost ends of the support 83 situated beneath the shafts 82 has a bearing 85 secured to it whose longitudinal axis extends parallel, or substantially parallel, to the longitudinal axis of the bearing 37. The bearing 85 accommodates a shaft 86 which is retained against axial displacement relative to the bearing 85 by two rings or collars 87 and 88 which are secured to the shaft 86 at opposite ends of the bearing 85 by small transverse pins 89 and 90 respectively. The ring or collar 88 carries an arm 91 which is located between two stops 92 secured to relatively opposite sides of the support 83 (see FIGURE 6). The arm 91 and stops 92 act to determine the maximum angle through which the shaft 86 can be turned relative to the bearing 85. The lowermost leading end of the shaft 86 has a stationary cutter blade 93 of the mowing bar 1 secured to it, this blade receiving a relatively movable cutter blade 94. A bracket 95 similar to the bracket 52 previously described is secured to the upper side of the cutter blade 94 and a journal or stub shaft which is secured to an arm 96 is disposed between the limbs of the bracket. The arm 96 is rigidly secured to one end of a shaft 97 which extends parallel to the pivot pins 82 and which is journalled in the support 83. A plate 98 reinforces the connection between the arm 96 and the shaft 97, the greater part of the plate 98 being spaced from the arm 96. A portion of the plate 98 which lies above the shaft 97 extends alongside, and parallel to, the support 83 and a portion of the arm 96 which also lies above the shaft 97 is bent over towards the plate 98 and has its uppermost end secured to the plate 98. The shaft 97 is retained against axial displacement relative to the support 83 by the plate 98 which bears against one side of the support and by a ring or collar 99 which is secured to the shaft 97 with the aid of a small transverse pin 100 at a location against the side of the support 83 remote from the plate 98.

A journal or stub shaft 101 is secured to the interconnected ends of the arm 96 and plate 98 so as to extend parallel to the pivot pins 82, a horizontal bearing 102 being freely rotatable about the journal or stub shaft 101. Two short trunnion pins 104 project from opposite sides of the bearing 102 at right-angles to the stub shaft or journal 101 and the limbs of a forked bracket 103 are pivotally connected to the pins 104. The base of the bracket 103 is secured to one end of a coupling rod 105 whose other end carries a horizontal bearing 106 (FIGURE 1) through which a shaft 107 (FIGURE 3) is entered so as to extend parallel to the journal or stub shaft 101. The shaft 107 established a pivotal connection between the coupling rod 105 and a connecting member which is generally indicated by the reference numeral 108.

The connecting member 108 comprises two parallel and spaced plates 109 whose lower ends are pivotally connected to a support 111 rigidly secured to the lowermost end of the sleeve 7 with the aid of a pivot pin 110 which extends perpendicular to the frame beam 6. A substantially vertical bearing 112 is secured to the opposite and upper ends of the plates 109 and accommodates a shaft 113 which is freely rotatable in the bearing but substantially axially immovable. A U-shaped bracket 114 has its base secured to the upper end of the shaft 113 and the aforementioned shaft 107 is mounted between the limbs of the bracket. The longitudinal axis of the shaft 113 intersects, and extends perpendicular to, that of the shaft 107. A pivot pin 115 which extends parallel to the pivot pin 110 is arranged between the two plates 109 immediately below the lowermost end of the shaft 113. One end of a connecting rod 116 is turnable about the pivot pin 115 and its opposite end is turnable about a parallel pivot pin 117 mounted between the two plates 68.

A vertical plate 118 projects upwardly from the upper one of the two arms 80 and is formed with a plurality of holes 119. One end of a cable 120 is entered through a selected one of the holes 119, the cable 120 being guided through a ring 121 secured to the upper end of the shaft 94 and around the pulley 14 associated with the plate 10. The end of the cable 120 remote from the plate 119 is secured to an arm 122 (FIGURE 4) which is pivotally connected to the arms 16 and 17 with the aid of the shaft 23. The arm 122 is, in fact, formed with a plurality of holes 123 and the ends of both the two cables corresponding to the mowing bars 1 and 3 can be connected with a chosen one of the holes 123 in the arm 122 by means of a disengageable hook or the like. In order to prevent the cable 120 from becoming disengaged from the pulley 14, a retaining arm 124 is secured to the top of the plate 10 so as to extend immediately above the said pulley.

A horizontally disposed arcuate strip 125 is fastened to the frame beam 6 in such a way that its center of curvature coincides with the longitudinal axis of the shaft 74. An arm 126 projects from the sleeve 75 and, at its free end, carries a bracket 127 between the limbs of which a spring-loaded vertical locking pin 128 is mounted. The strip 125 is formed with holes 129 at its opposite ends and the tip of the locking pin 128 can be entered through either one of these holes to retain the sleeve 75 and the parts connected thereto in a corresponding angular setting about the shaft 74.

It can be seen from FIGURES 1 and 3 that a pin 130 extending parallel to the shafts 79 is entered through the upper one of the two arms 80 so as to project from either side thereof. A horizontal pivot pin 131 (FIGURE 3) projects from one side of the sleeve 75 parallel to the shafts 79 and has two parallel spaced hooks 132 pivotably mounted upon it. A stop 133 secured to the sleeve 75 prevents the hooks 132 from turning downwardly about the pin 131 below a predetermined limit. The parts 131 to 133 have been omitted from FIGURE 1 for the sake of clarity but their positions in plan view can be seen by referring to FIGURE 7. A tubular beam 134 extends parallel to the frame beam 6 between the plates 10 and 11 and immediately above the arm 122. A lug or plate 135 is turnably mounted on the tubular beam 134 and is formed with a concave recess 136 at the end thereof remote from the said beam.

As illustrated in the drawings, the mower can be coupled to the three-point lifting device of a vehicle such as the tractor 137. The lower lifting links 138 and 139 of the three-point lifting device have their free ends pivotally connected to the ends of the rod or shaft 9 which project on relatively opposite sides of the two beams 8. The arm 122 serves as the third and uppermost lifting link of the lifting device and has the end thereof remote from the shaft 23 pivotally connected to a support of the tractor 137 which is provided for that purpose. The tractor 137 has a frame 140 which is supported by two driven ground wheels 141 and at least one steerable ground wheel which is not illustrated in the drawings. A seat 142 is mounted on the frame 140 in such a way as to be turnable about a substantially vertical axis and to be secured in chosen angular settings about that axis. This enables the seat 142 to which various steering and other controls of the tractor 137 are connected to face the mower which is disposed at the end of the tractor 137 which is rearmost for the majority of purposes.

The mower is shown in FIGURES 1 to 6 of the drawings in its normal operating position in which all three of the mowing bars 1 to 3 are operative. The mower is propelled by the tractor 137 in the direction indicated by the arrow A in FIGURE 1 and the rearmost end of the shaft 58 is connected by a universal joint 143 and a transmission shaft 144 (FIGURE 4) to the power take-off shaft of the tractor for the purpose of rotating the shaft 58 and the disc 62 carried thereby. It will be apparent from FIGURE 3 that the two rockable members are pivoted to and fro about the journals or stub shafts 65 and 66 respectively by virtue of the fact that the further journals or stub shafts 69 and 73 which they carry must follow the groove or track 63 as the disc 62 rotates. Each rockable member performs two reciprocations during one revolution of the disc 62. The journal or stub shaft 43 is also reciprocated by the brackets 70 carried at the lowermost ends of the two plates 68 of the rockable member which is turnable about the journal or stub shaft 65. The journal or stub shaft 43 pivots to and fro about the longitudinal axis of the shaft 40 and the plate 55 which is fastened to the arm 42 performs a similar movement. Since the journal or stub shaft 54 carried by the plate 55 is located between the limbs of the bracket 52, the movable cutter blade 51 of the mowing bar 2 is caused to reciprocate with respect to the relatively stationary cutter blade 50. It will be apparent that the movable cutter blades 94 of the two mowing bars 1 and 3 will be reciprocated in a similar manner with respect to the relatively stationary cutter blades 93 by way of the parts 116, 108, 105, 96 and 95.

The three mowing bars 1 to 3 are capable of matching undulations in the surface of the ground over which the mower is moving. The mowing bars are turnable about the longitudinal axes of the shafts 44 and 86 respectively and, moreover, the mowing bars 1 and 3 are movable in vertical directions independently of the mowing bar 2 by virtue of the pivotal connections of the arms 80 to the frame 5. The mowing bar 2 can itself move vertically by turning, together with its supporting plates 28 and 29, about the longitudinal axis of the shaft 27. However, pivotal movements of the mowing bar 2 about the shaft 27 in a downward direction are limited by virtue of the fact that the tubular shaft 25 comes into contact with the lowermost edge of the arm 122 whose uppermost edge abuts against the tubular beam 134. Pivotal movements in downward directions of the mowing bars 1 and 3 are also limited by the cables 120 which are stressed by such movements. The actual settings of the mowing bars 1 to 3 in the normal operative position of the mower can be adjusted by connecting the opposite ends of the cables 120 to different ones of the holes 119 and 123 and by entering the pins 33 and 34 through different ones of the holes 31 and 26 respectively.

Upon raising the lifting device of the tractor 137, the arm 122 turns about the shaft 23 in the direction indicated by the arrow B in FIGURE 4. The tubular shaft 25 which interconnects the arms 24 and which acts as a stop is forced downwardly in the same direction by the arm 122 so that, through the intermediary of the coupling rods 32, the mowing bar 2 is turned upwardly about the shaft 27 in the direction indicated by the arrow C in FIGURE 4. This brings the journal or stub shaft 43 out of the space between the limbs of the bracket 70. The two mowing bars 1 and 3 are turned upwardly away from the ground due to the fact that the cables 120 which are secured to the arm 122 are effectively shortened and turn the arms 80 from the position shown in full lines in FIGURE 3 to that shown in broken lines. When the arms 80 arrive in the position shown in broken lines, the hooks 132 engage around the opposite ends of the pins 130 so that, upon the lifting device of the tractor 137 being subsequently lowered, the mowing bars 1 and 3 are retained in their raised positions. The mowing bar 2 can also be prevented from turning downwardly about the shaft 27 when the lifting device of the tractor 137 is lowered by moving the lug or plate 135 to a position in which the tubular shaft 25 is disposed within the concave recess 136. This prevents the said tubular shaft 25 from moving back in a direction opposite to the direction indicated by the arrow B.

The shaft 23 which effectively affords a connection point between the tractor 137 and the mower, by way of the arm 122, can be turned about the axis afforded by the shaft 15 by rotating the rod 19 in an appropriate direction with the aid of the wheel 22. The actual effect of rotating the rod 19 is to turn the whole of the frame of the mower about the axis afforded by the rod or shaft 9 which is connected to the lower lifting links 138 and 139 of the lifting device of the tractor 137. The cutter bars 1 and 3 turn together with the frame of the mower so that their inclinations to the ground surface are altered. Moreover, a movement of the shaft 23 about the shaft 15 results in a consequent movement of the arm 122 so that the tubular shaft 25 is raised or lowered to a limited extent. Since the inclination of the central cutter bar 2 to the ground is determined by the position of the tubular shaft 25, the said inclination is also altered by rotating the wheel 22.

When it is not desired to utilize all of the three mowing bars 1 to 3 simultaneously, the mowing bar which it is wished to maintain out of action is retained in its raised position by means of the hooks 132 or the lug or plate 135 respectively. As has previously been described, the drive to the cutter bar 2 is disconnected when the said cutter bar is in its raised position by virtue of the fact that the journal or stub shaft 43 is disengaged from the bracket 70. When one of the outer mowing bars 1 or 3 is not in use, it is turned about the corresponding shaft 74 into the position shown for the mowing bar 3 in FIGURE 7. This is made possible by virtue of the fact that the mowing bars 1 and 3 are disposed at a higher level than the mowing bar 2 when all the mowing bars are in their raised positions and is effected by withdrawing the appropriate locking pin 128 and turning the sleeve 75 about the shaft 74 until the said locking pin comes into register with the hole 129 formed at the opposite end of the arcuate strip 125. Instead of extending (in plan view) parallel to the coupling rod 116, the coupling rod 105 then extends approximately perpendicular to the coupling rod 116. The parts 116 and 108 will still be reciprocated by the disc 62 but the coupling rod 105 will merely pivot to and fro about the trunnion pins 104 instead of transmitting drive to the mowing bar 3.

When it is desired to transport the mower from one place to another, both the outer mowing bars 1 and 3 are preferably placed in the position shown for the mowing bar 3 in FIGURE 7 so that at least the greater part of the mower is disposed within the path of travel of the tractor 137. This greatly facilitates passage of the mower through gateways and along public roads and the like.

What we claim is:

1. A mower comprising a frame movable over the ground and a mowing bar connected to said frame, said bar having a movable cutter blade and a relatively stationary cutting blade, said cutter blade being coupled to a rockable member, said member being pivotally mounted on said frame and having a part which cooperates with a driving rotatable guide means, said guide means being rotatably mounted on said frame to turn on an axis substantially parallel to the axis of rotation of said rockable member and at least one additional mowing bar including a movable cutter blade and a relatively stationary cutter blade, said additional mowing bar being connected to said frame in laterally offset relationship with respect to said first mentioned mowing bar, a first link means connected to said movable cutter of said additional mowing bar at one end and connected to a second rockable member at the other end, a second link means connecting said first and said second rockable members.

2. The mower of claim 1 wherein the guide means is adapted for connection to the power take-off shaft of a tractor.

3. The mower of claim 1 wherein the first rockable member and the guide means are turnable on axes substantially perpendicular to the mowing bar.

4. The mower as claimed in claim 1 wherein the guide means is a track in a disc, and the first rockable member has a stub shaft located within the said track.

5. A mower as claimed in claim 1, wherein said additional mowing bar is connected to said frame by hinge means having a substantially vertical axis, said additional mowing bar being pivotable through an angle of approximately 90°.

6. A mower as claimed in claim 5, wherein the additional mowing bar is turnable through an angle of approximately 90° out of its operative position and the first link means is extendable approximately parallel to the axis about which the second rockable means is pivotable relative to the frame.

7. A mower as claimed in claim 5 wherein said second rockable means has two parts and the axis about which a first part of the second rockable member is turnable relative to the second part extends substantially parallel to the axis about which the additional mowing bar is turnable.

8. A mower according to claim 1 wherein a further mowing bar is connected to the frame in laterally offset relationship of said first mentioned mowing bar, said further mowing bar being turnable towards the first mentioned mowing bar about an axis inclined to the horizontal, means provided to retain said further mowing bar in any one of at least two angular settings about said axis.

9. A mower as claimed in claim 8, wherein said further mowing bar is driven by a third rockable member and the said non-circular guide, further linking means connecting said further mowing bar and said noncircular guide.

10. A mower as claimed in claim 9, wherein the first mentioned mowing bar is driven by means including an arm pivotally connected to the frame of the mower.

11. A mower as claimed in claim 10, wherein the mowing bar driven by the arm bears a stub shaft, said shaft being located between the limbs of a bracket carried by one of the rockable members.

12. A mower as claimed in claim 11 wherein, in an inoperative position, the first mowing bar is turned upwardly about said axis relative to its operative position, the stub shaft secured to the arm being removed from between the limbs of the bracket in the inoperative position.

13. The invention of claim 1 wherein the additional mowing bar is provided with a support, said additional mowing bar being turnable relative to said support about a substantially horizontal axis extending substantially perpendicular to the longitudinal axis of said additional mowing bar, said support being turnable relative to the frame about a second axis extending substantially perpendicular to said horizontal axis.

14. A mower as claimed in claim 13, wherein the support is connected to the frame of the mower by a parallelogram linkage which is turnable about substantially horizontal axes, whereby pivotal movement of the parallelogram linkage about said axes causes a change in the level of the support relative to the ground.

15. A mower as claimed in claim 13, wherein the support together with the mowing bar connected thereto can be adjusted in height relative to the frame of the mower, means being provided to retain the said support and mowing bar in a setting located at a higher level than that of the first mentioned mowing bar of the mower.

16. A mower as claimed in claim 1, wherein said mower includes coupling members for coupling the mower to the lifting device of a tractor and a coupling member to which one link of a lifting device can be pivotally coupled is turnable relative to the frame of the mower about an axis extending substantially parallel to the longitudinal axis of the said first mentioned mowing bar, means being provided to retain said coupling member in any one of a number of different angular settings about said axis.

17. A mower as claimed in claim 1, wherein the mower has coupling members adapted for coupling to the links of the lifting device of a tractor whereby on raising the said lifting device a link of said lifting device turns relative to the frame of the mower and at least one mowing bar is turned by the said link relative to the frame of the mower.

18. A mower as claimed in claim 1, wherein the first mentioned mowing bar is connected with the frame of the mower so as to be pivotable about an axis extending substantially parallel to its own longitudinal axis, said first mentioned mowing bar also being connected to an arm which is pivoted to the frame, said arm having a stop adapted to contact a link of a lifting device when the mower is raised by the said lifting device whereby the arm, the stop and the mowing bar are all turned relative to the frame of the mower.

19. A mower comprising a frame movable over the ground and a mowing bar mounted on the front of said frame, said bar having a reciprocating cutter blade and a cooperating relatively stationary cutting blade, and at least one additional mowing bar mounted on said frame and laterally offset with respect to said first mentioned mowing bar, said additional mowing bar including a reciprocating cutter blade and a cooperating relative stationary cutting blade, hinge means connecting said additional mowing bar to said frame, said hinge means defining a substantially vertical axis, whereby said additional mowing bar is pivotable towards the first mentioned mowing bar about said axis from a first setting through an angle of about ninety degrees into a second setting to a position overlying said first mentioned mowing bar, releasable latch means being provided to retain said additional mowing bar in said settings.

References Cited by the Examiner

UNITED STATES PATENTS

| | | | |
|---|---|---|---|
| 1,672,461 | 6/1928 | Lehr | 56—25 |
| 1,944,584 | 1/1934 | Stegeman et al. | 56—7 |
| 2,067,158 | 1/1937 | Moyer | 56—7 |
| 2,150,350 | 3/1939 | Vargas | 56—6 |
| 2,509,993 | 5/1950 | Soss | 56—26 |
| 2,833,367 | 5/1958 | Pool et al. | 180—77 |
| 2,867,070 | 1/1959 | McCall et al. | 56—296 |
| 3,034,274 | 5/1962 | Webb | 56—6 |
| 3,039,553 | 6/1962 | Van der Lely et al. | 180—77 |
| 3,177,638 | 4/1965 | Johnson | 56—7 |

FOREIGN PATENTS 742,595  12/1955  Great Britain.

ABRAHAM G. STONE, *Primary Examiner.*

ANTONIO F. GUIDA, T. GRAHAM CRAVER,
*Examiners.*

J. O. BOLT, *Assistant Examiner.*